F. J. Simeon,
Nose Bag,
Nº 55,726. Patented June 19, 1866.
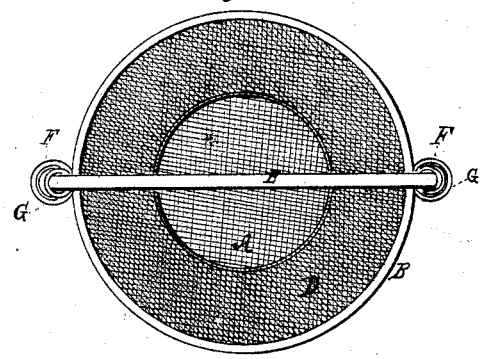
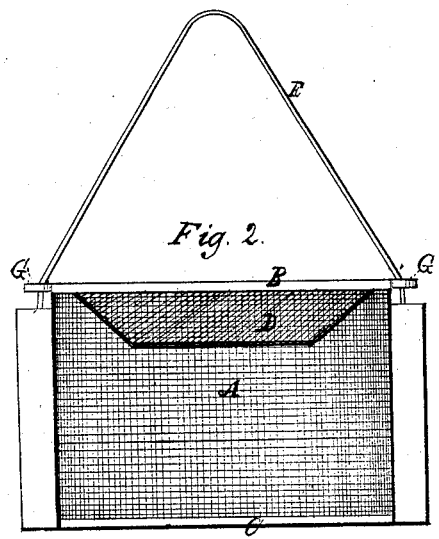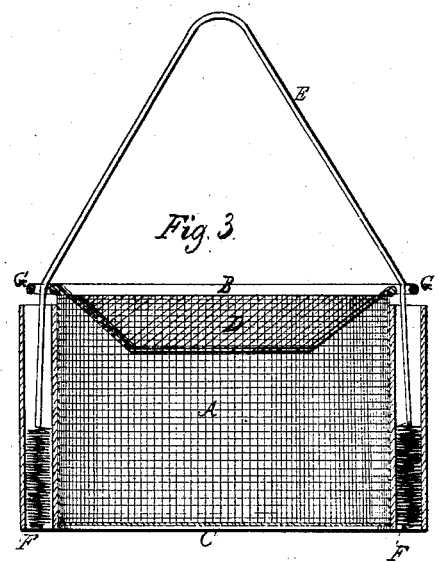
Witnesses.
A. Wickham Hore
Lucius W. How
Inventor,
Felix J. Simeon
By How & Weston
Attys.

UNITED STATES PATENT OFFICE.

FELIX JOHN SIMEON, OF BROOKLYN, NEW YORK.

IMPROVEMENT IN FEED-BAGS.

Specification forming part of Letters Patent No. 55,726, dated June 19, 1866.

*To all whom it may concern:*

Be it known that I, FELIX J. SIMEON, of Brooklyn, in the county of Kings and State of New York, have invented an Improved Feed-Bag, of which the following is a specification.

My invention consists of a bag or receptacle for oats or other feed for a horse, made of an open or perforated material, so that the air can circulate freely through it and the dust and dirt contained in the feed escape, said feed-bag being supported by a strap passing over the horse's head and connected to springs which hold the feed up to the horse's mouth without the use of the stand; and it has for its object the cleansing of the feed from impurities and the better preservation of the health of the horse from the injuries which would be likely to result to it from inhaling such dust and dirt, and also the doing away with the stand for supporting the feed-bag while the horse is eating.

In the accompanying drawings, Figure 1 is a plan of my feed-bag. Fig. 2 is a side elevation of the same. Fig. 3 is a vertical transverse section through the center of the same.

A is a bag or receptacle, made of wire-cloth having meshes sufficiently fine to keep the feed from falling through, and at the same time coarse enough to allow the dust and dirt to escape, and to admit of a free circulation of air through the bag, so that the horse shall be supplied with plenty of fresh air during the time of feeding. This bag is guarded from injury by wire rings B C of considerable thickness at both top and bottom. The top D is formed like an inverted frustum of a cone, which prevents the spilling of the feed by the motion of the horse's head.

E is the strap by which the bag is supported. It passes over the horse's head, and should be furnished with a buckle near the middle to adjust it to the proper length. The lower ends of this strap are fastened to springs F F, which carry the weight of the bag and feed, and as the feed is consumed by the horse they lift it gradually, so as to keep the feed in contact with the horse's mouth, and thus avoid the necessity of using a stand or rest for the bag in order to enable the horse to reach the feed.

In the construction shown in the drawings, the springs are inclosed in a tube or case, which is intended to protect them from injury. These cases are securely fastened to the rings C and to the side of the bag. If preferred, they may be placed inside and may be set perpendicularly, or in a line with the draft on the strap.

G G are rings, which are fastened to the ring B, to give the strap the proper direction inside of the casing, so that it shall not draw the spring against the side of the casing and prevent its efficient action.

By the use of this bag the breath of the horse is allowed to escape, thereby keeping the feed fresh and pure, the horse is supplied with fresh air, which conduces to his comfort and health, and the dust and other impurities in the grain are allowed to escape, thus cleansing the feed and saving the horse from the evils of inhaling them.

Having thus fully described my invention, I claim—

1. Constructing both the sides and bottom of a feed-bag of perforated metal or wire-cloth, substantially as and for the purpose set forth.

2. The combination, with an open or perforated feed-bag, of the springs F F and strap E, substantially as and for the purpose set forth.

FELIX JOHN SIMEON.

Witnesses:
H. JAMES WESTON,
LUCIUS W. HOW.